(12) United States Patent
Shiau et al.

(10) Patent No.: US 8,390,429 B2
(45) Date of Patent: Mar. 5, 2013

(54) MOBILE RFID MONITORING SYSTEM AND METHOD THEREOF

(75) Inventors: Jun-Ting Shiau, Hsinchu (TW); Ta-Yung Lee, Hsinchu (TW); Jen-Hao Hsu, Hsinchu (TW); Chia-Chin Yu, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 775 days.

(21) Appl. No.: 12/358,990

(22) Filed: Jan. 23, 2009

(65) Prior Publication Data

US 2010/0188194 A1    Jul. 29, 2010

(51) Int. Cl.
*H04Q 5/22* (2006.01)
*G08B 1/08* (2006.01)
*G08B 5/22* (2006.01)
*H04M 11/04* (2006.01)
*H04W 24/00* (2009.01)
*H04L 12/28* (2006.01)
*G06F 15/177* (2006.01)

(52) U.S. Cl. .......... 340/10.1; 340/539.13; 340/8.1; 455/404.2; 455/456.1; 455/456.2; 370/401; 370/402; 370/403; 370/404; 370/405; 709/218

(58) Field of Classification Search .......... 340/7.27, 340/7.29, 8.1, 539.13; 455/404.2, 456.1, 455/456.2; 370/401–405
See application file for complete search history.

(56) References Cited

U.S. PATENT DOCUMENTS

| 4,656,463 | A  | * | 4/1987  | Anders et al.     | 340/573.4  |
| 7,034,678 | B2 | * | 4/2006  | Burkley et al.    | 340/539.13 |
| 7,075,436 | B2 | * | 7/2006  | Shanks et al.     | 340/572.1  |
| 2001/0048364 | A1 | * | 12/2001 | Kalthoff et al. | 340/573.1  |
| 2007/0120671 | A1 | * | 5/2007  | Carmichael et al. | 340/572.1 |

* cited by examiner

*Primary Examiner* — Daniel Wu
*Assistant Examiner* — John Bamert

(57) ABSTRACT

A mobile RFID (Radio Frequency Identification) system and method are provided to monitor multiple control zones of the system simultaneously through a mobile outpost monitor. The control zones included in the system are connected with each other through a data exchange interface. Each of the control zones includes a link interface connecting with a gateway of at least one RFID tracking module. The gateway connects with at least one RFID reader and a signal transmitter to receive tag information of RFID tags within the control zone, and transmits the tag information through the signal transmitter. When the mobile outpost monitor moves from one control zone to another, the mobile outpost monitor may switch to link with the signal transmitter of the gateway in the current control zone. Through the data exchange interface, the mobile outpost monitor is able to obtain the monitoring information of another control zones.

16 Claims, 6 Drawing Sheets

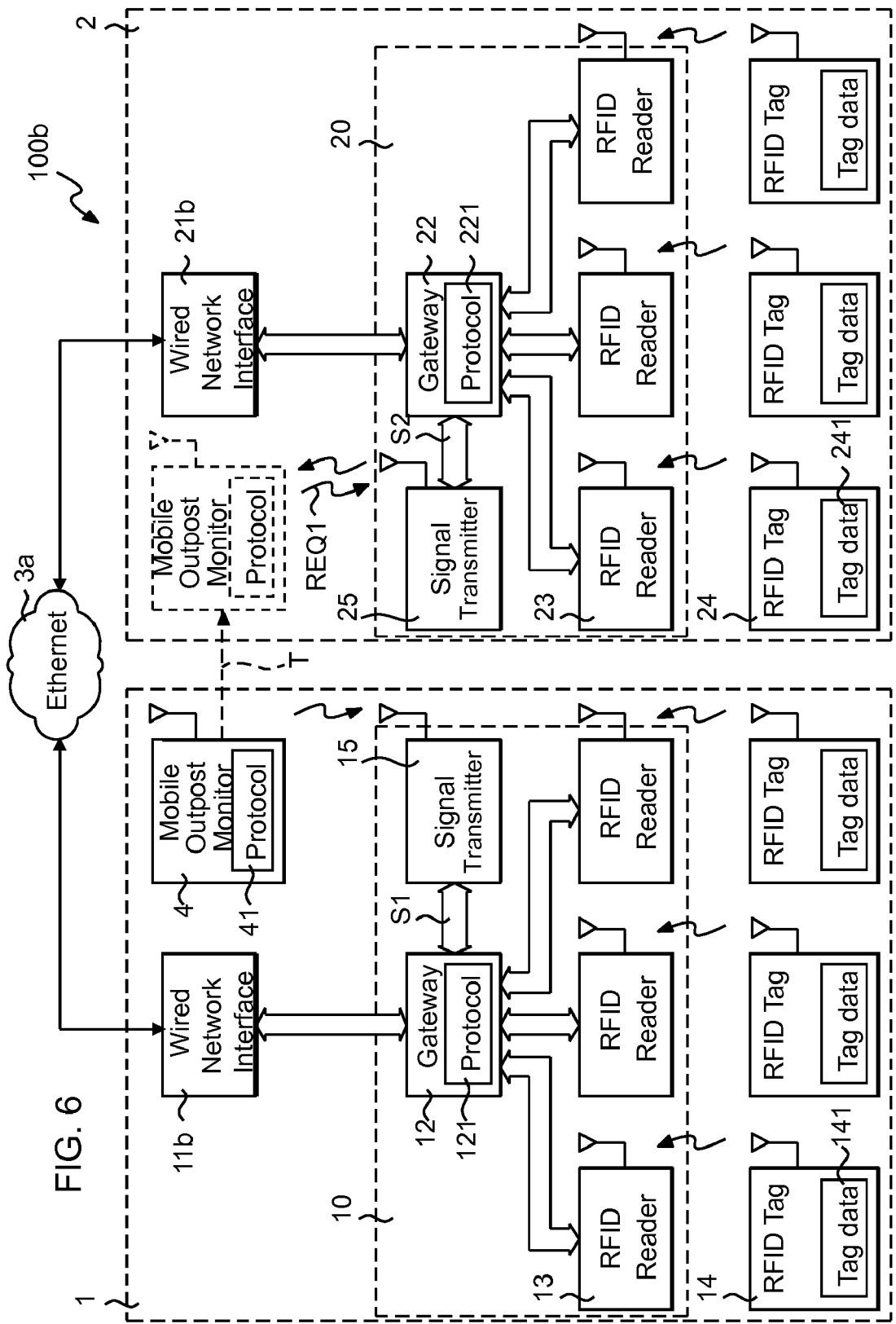

MOBILE RFID MONITORING SYSTEM AND METHOD THEREOF

BACKGROUND OF THE INVENTION

1. Field of the Invention

The present invention relates to the design of RFID (Radio Frequency Identification) monitoring system, and more particularly, to a mobile monitoring system and method for monitoring different control zones simultaneously.

2. Related Art

RFID (Radio Frequency Identification) system mainly consists of RFID tag, RFID reader and the management processor. Through wireless RF (radio frequency) signals, the information stored inside the RFID tag is transmitted to the RFID reader. Meanwhile, the RF signal may be used as the power for wireless transmission and make the RFID tag operate almost permanently with a battery. The RFID system market includes not only designing the reader and tag, other relevant application software and services are tremendous businesses. Currently there are many companies and countries aiming at the developments and researches regarding tad/reader design and relevant application software for the RFID system.

The application scopes for the RFID tag are very broad, including local control system, door guard system, logistics management system, industrial safety personnel management and material management system and etc. Taiwan Patent Publication No. 200723175 discloses an automatic monitoring/protecting RFID system for campus security Active "Ultra High Frequency" RFID technology is applied to a campus security monitoring/protecting mechanism. Active RFID tags are provided and carried by students. When a student passes a security zone with preset RFID readers as positioning devices, the active RFID tag will receive driving signal(s) from the RFID readers. The active RFID tag will then send its data to the RFID reader. The data of the active RFID tag will be further sent to a management server for integration. Afterwards, the management server will send these integrated data to an application server. The application server will then transmit the integrated data to students, their parents or centralized campus management. Specific messages regarding the student's presence in campus, absence without permission, bursting in a security zone or detention in a campus bus and etc., will be sent to mobile phones and computers of relevant parties for notice purposes.

Taiwan Patent Publication No. 200622750 discloses a temperature monitoring system for articles during transportation. The temperature monitoring system for articles during transportation includes a transportation section, a host computer and a monitoring section. The transportation section includes a transportation vehicle, a container box, a RFID tag and a RFID reading unit; wherein the container box is carried on the transportation vehicle. The RFID tag is located in the container box, capable of transmitting an identification code. Furthermore, the RFID tag detects the temperature and transfers into a temperature signal. The RFID reading unit is configured within the transportation vehicle and able to read the temperature signal and the identification code. The host computer receives the temperature signal and the identification code and transmits a positioning request signal to receive a responded location signal. Then the host computer transmits the location signal, the temperature signal and the identification code through a specific way. The monitoring section includes a positioning device and a logistic center. When the positioning device transmits the location signal to the host computer, the logistic center receives the location signal, the temperature signal and the identification code to confirm the location of the container box and the temperature.

However, the convention RFID system in the prior art is to receive the messages in a remote control room, through the operation workers to process the RFID-related information by a backend apparatus, and report the received information to the field engineers to solve the condition or problems. Such processing processes are time-consuming and delays the instant response capability of the system. Moreover, the conventional mobile RFID monitoring apparatus (such as a mobile RFID reader) can only monitor the object information in the same control zone. Once the conventional mobile RFID monitoring apparatus leaves the signal range of the control zone, there will be no way to understand the conditions of the control zone.

SUMMARY OF THE INVENTION

Accordingly, the present invention provides a mobile RFID monitoring system, which links different control zones within a RFID monitoring system through a data exchange interface (such as wireless or wired network), and allows the user to monitor the conditions of all the control zones without communicating with the backend workers. If locating in one of the control zones, the user may still know the conditions within another of the control zones.

In an embodiment of the present invention, a mobile RFID (Radio Frequency Identification) system is provided to monitor multiple control zones of the system simultaneously through a mobile outpost monitor. The control zones included in the system are connected with each other through a data exchange interface. Each of the control zones includes a link interface connecting with a gateway of at least one RFID tracking module. The gateway connects with at least one RFID reader and a signal transmitter to receive tag information of RFID tags within the control zone, and transmits the tag information through the signal transmitter. When the mobile outpost monitor moves from one control zone to another, the mobile outpost monitor may switch to link with the signal transmitter of the gateway in the current control zone. Through the data exchange interface, the mobile outpost monitor is able to obtain the monitoring information of another control zones.

By means of the technology disclosed in the present invention, the numbers of employees assigned in a RFID monitoring system and the backend monitoring communication tasks may all be reduced, and thereby increasing the system operation performance. Whenever necessary, the user may access instant information within different control zones in parallel, so as to increase the width of monitoring information and monitor all information including workers, materials, fixed or mobile objects in each of the control zones more precisely.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein:

FIG. 6 is a system block diagram of a second embodiment according to the present invention.

DETAILED DESCRIPTION OF THE INVENTION

Figure 1:
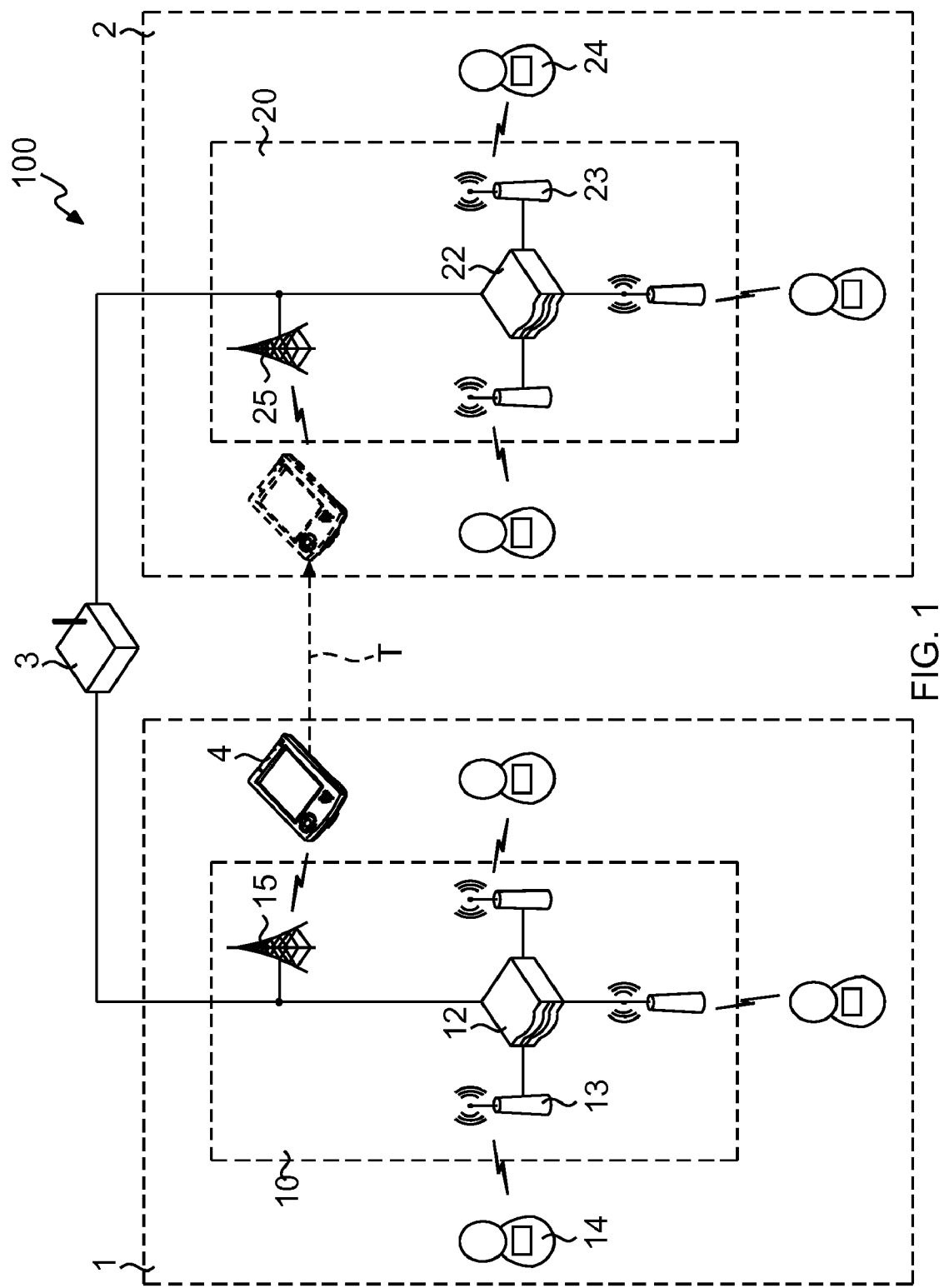
FIG. 1 is an explanatory diagram of the mobile RFID monitoring system according to the present invention.

Reference will now be made in detail to the present preferred embodiments of the invention, examples of which are illustrated in the accompanying drawings. Wherever possible, the same reference numbers are used in the drawings and the description refers to the same or the like parts.

Figure 2:
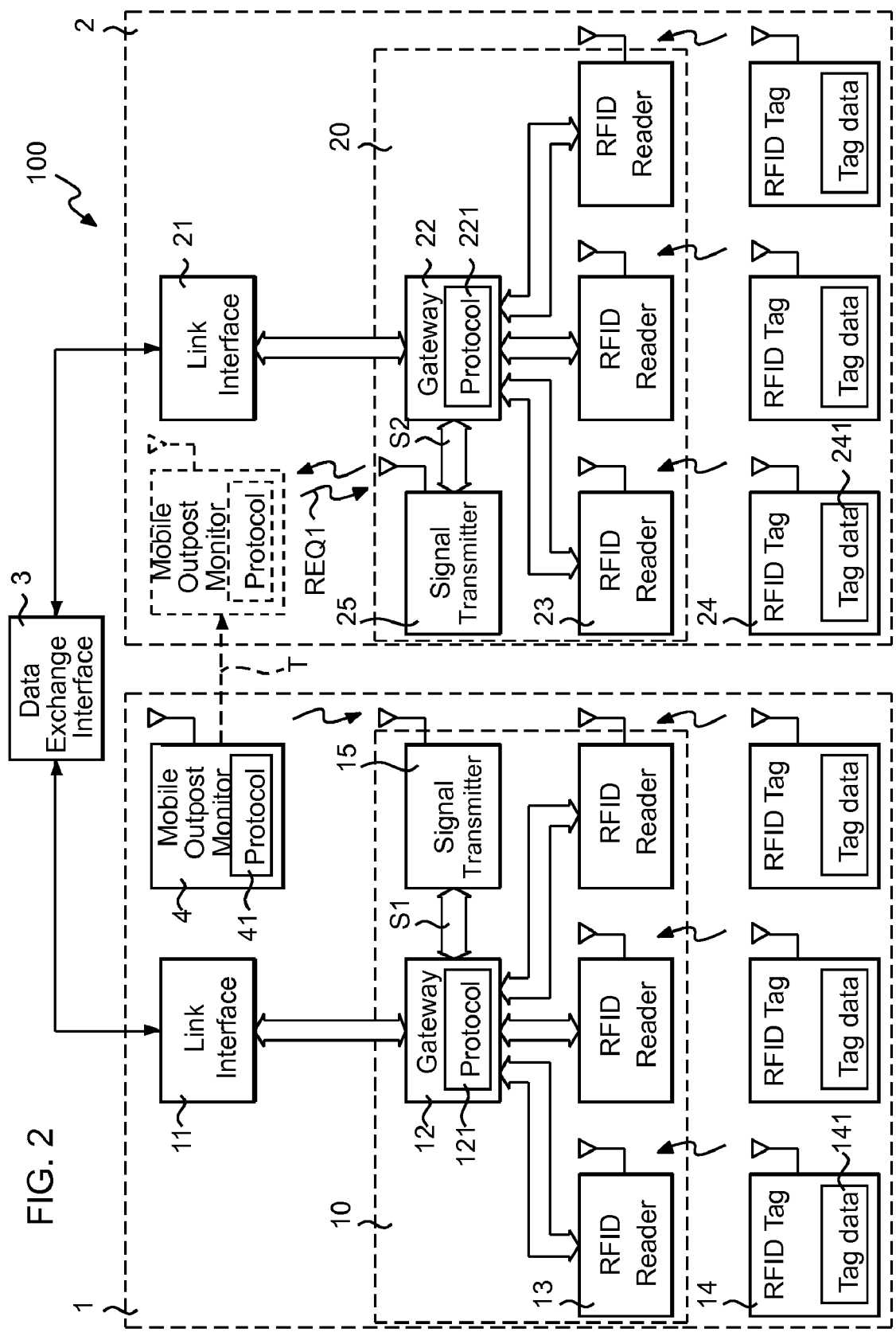
FIG. 2 is a system block diagram of the mobile RFID monitoring system according to the present invention.

Please refer to FIG. 1 and FIG. 2 in parallel; wherein FIG. 1 is an explanatory diagram of the mobile RFID (Radio Frequency Identification) monitoring system according to the present invention, and FIG. 2 is a system block diagram of the mobile RFID monitoring system according to the present invention. As shown in the drawings, the mobile RFID monitoring system 100 of the present invention includes multiple control zones; here only a control zone 1 and another control zone 2 are illustrated for clear explanations.

A link interface 11 is configured in the control zone 1. The link interface 11 connects with at least one gateway 12 (only one gateway 12 is used as an example in the drawing) of a RFID tracking module 10. The gateway 12 connects with at least one RFID reader 13 (three RFID readers 13 are used as an example in the drawing), which receives the RF (Radio Frequency) waves transmitted from at least one RFID tag 14 surrounding the RFID reader 13 within the control zone 1.

Similarly, a link interface 21 is configured in the control zone 2. The link interface 21 connects with at least one gateway 22 (only one gateway 22 is used as an example in the drawing) of a RFID tracking module 20. The gateway 22 connects with at least one RFID reader 23 (three RFID readers 23 are used as an example in the drawing), which receives the RF waves transmitted from at least one RFID tag 24 surrounding the RFID reader 23 within the control zone 2.

Between the control zone 1 and the control zone 2, a data exchange interface 3 is connected between the link interface 11 of the control zone 1 and the link interface 21 of the control zone 2, so as to form a connected network architecture between the control zone 1 and the control zone 2. Consequently, at least one mobile outpost monitor 4 may monitor all the control zones covered in the mobile RFID monitoring system 100 in parallel.

In the control zone 1, each of the RFID readers 13 receives tag data 141 of the surrounding RFID tag(s) 14, and transmits the received tag data 141 of the surrounding RFID tag(s) 14 to the gateway 12; corresponding monitoring information S1 is generated accordingly. In the actual application, for example, the RFID tags 14 may be attached to operators or materials in a manufacturing facility to monitor and control any fixed or mobile object. The gateway 12 of the control zone 1 comprises a preset communication protocol "Protocol" 121 and connects with a signal transmitter 15.

Similarly, in the control zone 2, each of the RFID readers 23 receives tag data 241 of the surrounding RFID tag(s) 24 and transmits the tag data 241 of the surrounding RFID tag(s) 24 to the gateway 22; corresponding monitoring information S2 is generated accordingly. In the control zone 2, the gateway 22 has a preset communication protocol "Protocol" 221 and connects with a signal transmitter 25. The mobile outpost monitor 4 has a corresponding communication protocol "Protocol" 41, thereby conducting the mobile outpost monitor 4 to link with the gateway 12 and receive the signals sent from the signal transmitter 15, or link with the gateway 22 and receive the signals sent from the signal transmitter 25.

Figure 3:
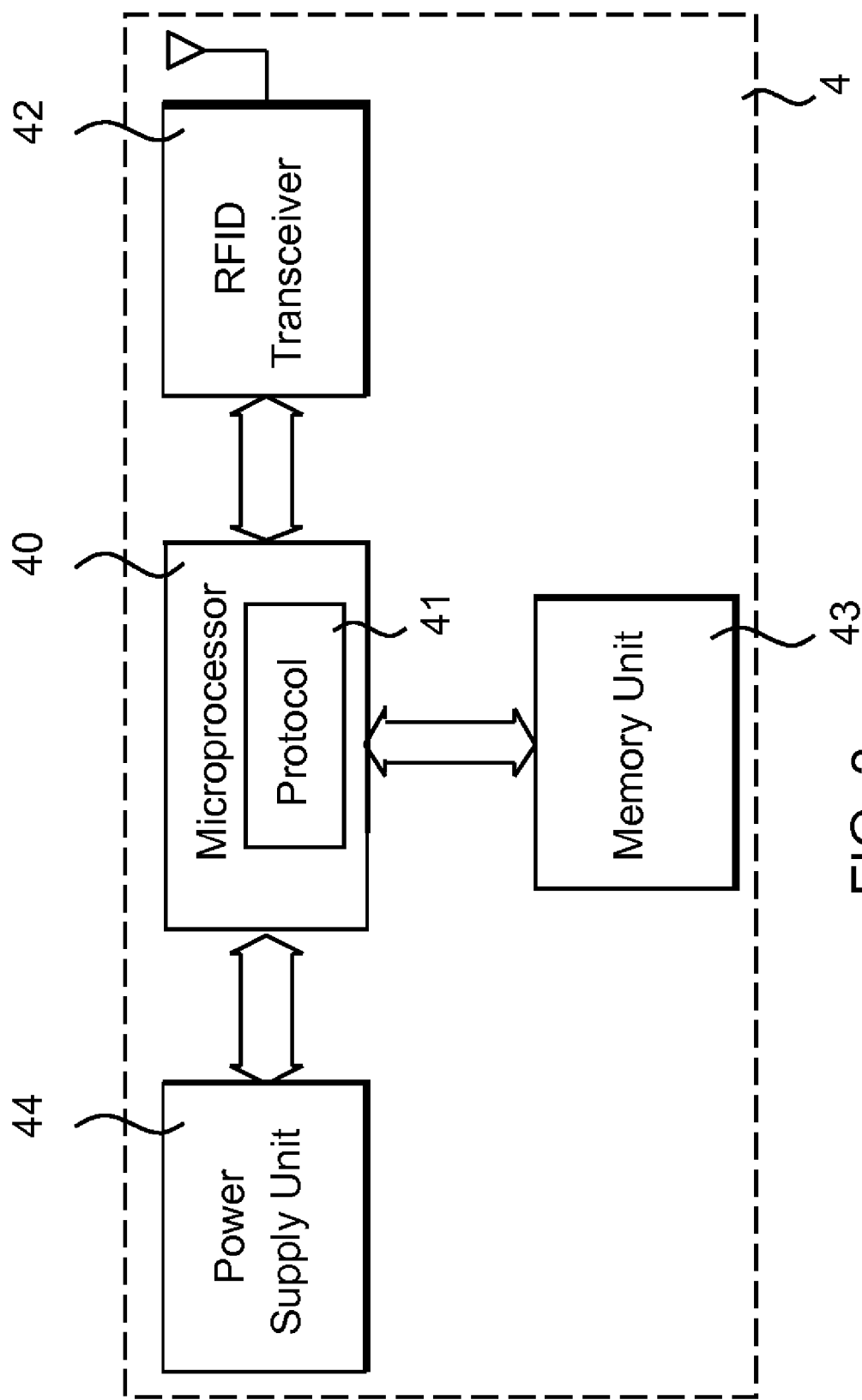
FIG. 3 is an illustrative system diagram of the mobile outpost monitor in FIG. 1.

Please refer to FIG. 3, which is an illustrative system diagram of the mobile outpost monitor in FIG. 1. As shown in the drawing, the mobile outpost monitor 4 may be realized by a RFID reader, which includes a microprocessor 40 with communication protocol "Protocol" 41 equipped therein. The microprocessor 40 connects with a RFID transceiver 42, a memory unit 43 and a power supply unit 44. The mobile outpost monitor 4 mainly receives and transmits wireless signals through the RFID transceiver 42, and supplied with required power by the power supply unit 44. Aside from the fixed RFID reader in the system, the mobile outpost monitor 4 may provide an active monitoring function through RFID signaling.

Figure 4:
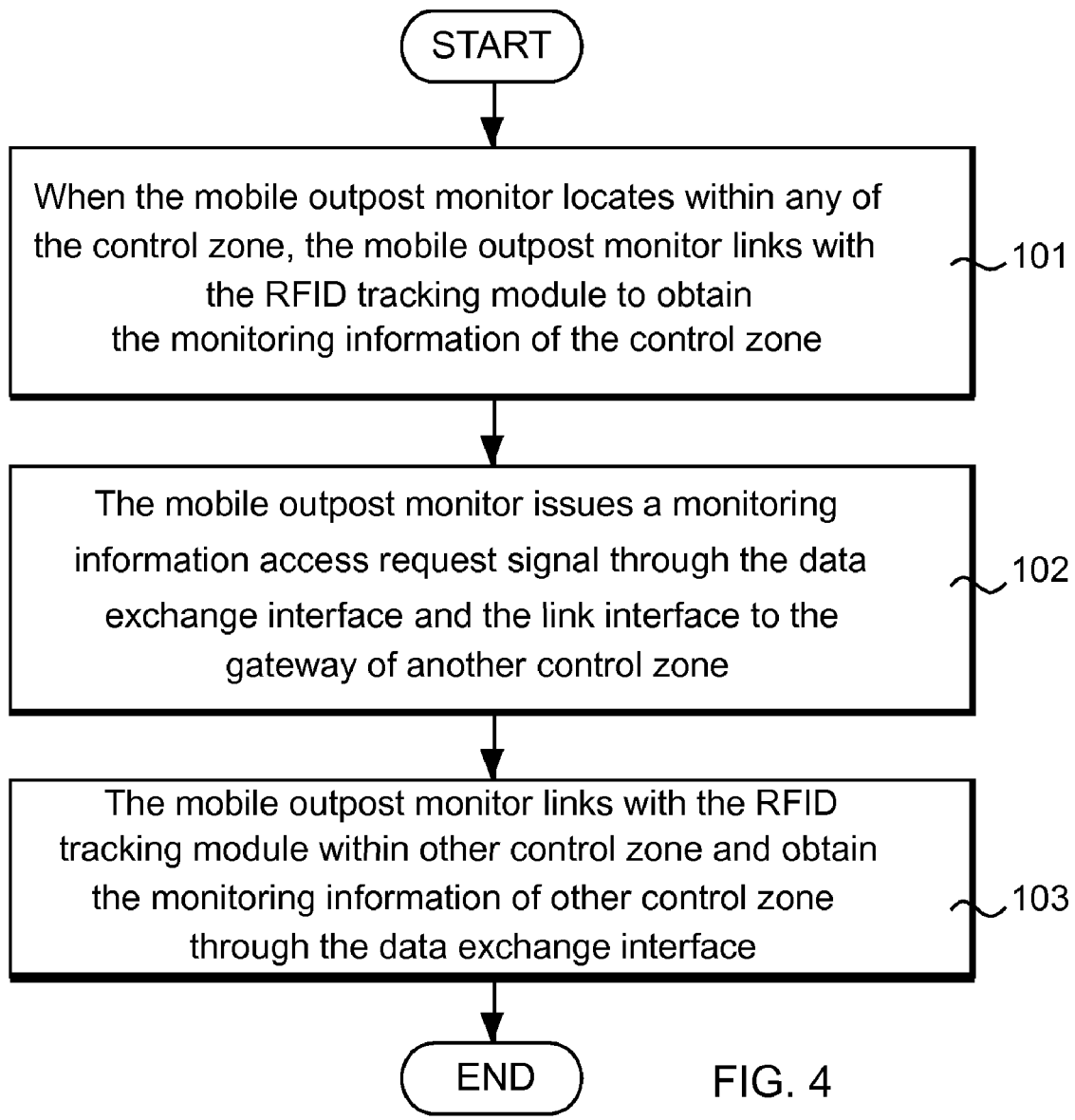
FIG. 4 is a flow chart of the mobile RFID monitoring method according to the present invention.

Please refer to FIG. 4, which is a flow chart of the mobile RFID monitoring method according to the present invention. When the mobile outpost monitor 4 stays in the control zone 1, through the wireless link with the signal transmitter 15 of the control zone 1 within the gateway 12, the mobile outpost monitor 4 is able to obtain the monitoring information S1 that includes the tag data 141 of each of the RFID tags 14 through the signal transmitter 15 and the gateway 12, thereby conducting active scanning and monitoring operations onto each of the RFID tags 14 within the control zone 1.

When the mobile outpost monitor 4 moves to the control zone 2 (through the path T as shown in FIG. 2), the mobile outpost monitor 4 switches to link with the gateway 22 of the RFID tracking module 20 within the control zone 2 through the signal transmitter 25, thereby obtaining the monitoring information S2 through the signal transmitter 25 and the gateway 22 (Step 101) and monitoring each of the RFID tags 24 within the control zone 2. At this moment, if any user carries the mobile outpost monitor 4 and intends to monitor the monitoring information S1 of the control zone 1, the mobile outpost monitor 4 may be used to issue an monitoring information access request signal REQ1, through the signal transmitter 25, the gateway 22 and the link interface 21 of the control zone 2, then the data exchange interface 3 and the link interface 11 to the gateway 12 of the control zone 1 (Step 103). wire The mobile outpost monitor 4 and the RFID tracking module 10 (or the gateway 12) of the control zone 1 will be able to link with each other through the data exchange interface 3 and the mobile outpost monitor 4 will be able to obtain the monitoring information S1 of the gateway 12 within the control zone 1 (Step 104).

Such method will allow the user carrying with the mobile outpost monitor 4 to monitor the monitoring information of different control zones when the user leaves from a control zone to another, provided that the mobile outpost monitor switches to alternatively link with the gateways of different control zones. Therefore, different monitoring information of the two different control zones may still be well monitored by the same mobile outpost monitor.

Figure 5:
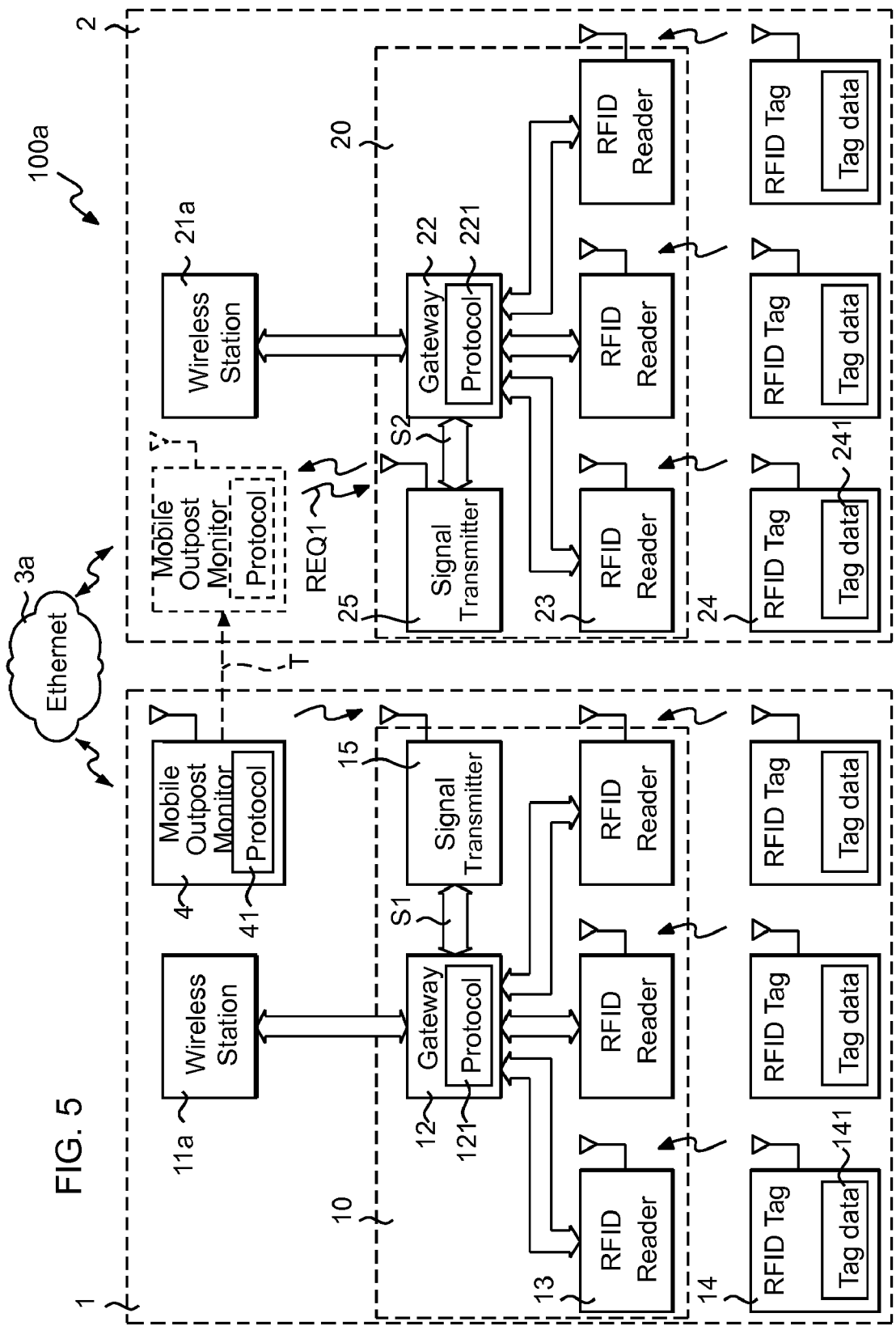
FIG. 5 is a system block diagram of a first embodiment according to the present invention.

Please refer to FIG. 5, which is a system block diagram of a first embodiment according to the present invention. The present embodiment has similar composition as the foregoing example; the major difference is that the link interface 11 of the control zone 1 above (the one in FIG. 2 for example) is realized by a wireless station 11a in the present embodiment.

The wireless station 11*a* connects with at least one gateway 12, through which the wireless station 11*a* connects with at least one RFID reader 13. The RFID reader 13 receives the RF waves transmitted by a RFID tag 14 surrounding the RFID reader 13 within the control zone 1.

Similarly, a wireless station 21*a* is configured in the control zone 2. The wireless station 21*a* connects with at least one gateway 22. Through the gateway 22, the wireless station 21*a* connects with at least one RFID reader 23 to receive the RF waves transmitted from the RFID tag 24 surrounding the RFID reader 23 within the control zone 2.

The data exchange interface 3 (such as the one in FIG. 2) may be an Ethernet 3*a*, connected between the wireless station 11*a* of the control zone 1 and the wireless station 21*a* of the control zone 2. In a practical implementation, through the node connections through the Ethernet 3*a*, the control zone 1 and the control zone 2 may form a peer-to-peer network architecture, thereby conducting the mobile outpost monitor 4 to monitor all the control zones within the mobile RFID monitoring system 100*a* in parallel.

The present embodiment has operation processes similar to the foregoing. The major difference is the transmission method between the control zone 1 and the control zone 2. Only in the present embodiment, the data exchange is performed through wireless Ethernet 3*a*. The details of operation processes are omitted without further description.

Please refer to FIG. 6, which is a system block diagram of a second embodiment according to the present invention. The present embodiment has the composition similar to the first embodiment. A wired network interface 11*b* is configured in the control zone 1 and connected with at least one gateway 12. The gateway 12 connects with at least one RFID reader 13 to receive the RF waves transmitted from the RFID tag 14 surrounding the RFID reader 13 of the control zone 1.

Similarly, a wired network interface 21*b* is configured in the control zone 2 and connected with at least one gateway 22. The gateway 22 connects with at least one RFID reader 23 to receive the RF waves transmitted from the RFID tag 24 surrounding the RFID reader 23 within the control zone 2.

The present embodiment uses an Ethernet 3*a* to facilitate a wired connection between the wired network interface 11*b* of the control zone 1 and the wired network interface 21*b* of the control zone 2, thereby allowing the mobile outpost monitor 4 to monitor all the control zones within the mobile RFID monitoring system 100*b*.

The present embodiment has operation processes similar to the foregoing. The major difference is the transmission method between the control zone 1 and the control zone 2. Only in the present embodiment, the data exchange is performed through wired Ethernet 3*a*. The details of operation processes are omitted without further description.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A mobile RFID (Radio Frequency Identification) monitoring system, comprising:
   at least a first control zone having a first signal range and a second control zone having a second signal range, the first control zone comprising a first RFID tracking module, the second control zone comprising a second RFID tracking module, wherein the first RFID tracking module includes at least one RFID reader obtaining tag data transmitted from at least one RFID tag located within the first signal range and generating a monitoring information according to the tag data, and the second RFID tracking module includes at least one RFID reader obtaining tag data transmitted from at least one RFID tag located within the second signal range and generating a monitoring information according to the tag data;
   the first control zone comprising a first link interface configured therein, the first link interface connecting with the first RFID tracking module to obtain the monitoring information generated by the first RFID tracking module;
   the second control zone comprising a second link interface configured therein, the second link interface connecting with the second RFID tracking module to obtain the monitoring information generated by the second RFID tracking module;
   a data exchange interface connecting the first and second control zones; and
   a mobile outpost monitor including at least one RFID transceiver, configured such that when the mobile outpost monitor is located in the first signal range of the first control zone, the mobile outpost monitor links to the first RFID tracking module to obtain the monitoring information of the first control zone, and links to the second RFID tracking module through the first link interface, the data exchange interface and the second link interface to receive the monitoring information of the second control zone, and when the mobile outpost monitor is moved out of the first signal range and into the second signal range of second control zone, the mobile outpost monitor links to second RFID tracking module to obtain the monitoring information of the second control zone, and links to the first RFID tracking module through second link interface, the data exchange interface and the first link interface to receive the monitoring information of the first control zone.

2. The mobile RFID monitoring system of claim 1, wherein the first and second RFID tracking modules each include at least one gateway, the gateway connecting the respective RFID reader and link interface.

3. The mobile RFID monitoring system of claim 2, wherein the gateway further connects with a signal transmitter and the monitoring information is transmitted through the signal transmitter to the mobile outpost monitor.

4. The mobile RFID monitoring system of claim 2, wherein the gateway and the mobile outpost monitor are linked through a preset communication protocol.

5. The mobile RFID monitoring system of claim 1, wherein the data exchange interface is an Ethernet.

6. The mobile RFID monitoring system of claim 1, wherein the mobile outpost monitor is a mobile RFID reader.

7. The mobile RFID monitoring system of claim 1, wherein the link interface is a wireless is a wireless station.

8. The mobile RFID monitoring system of claim 1, wherein the link interface is a wired network interface.

9. A mobile RFID (Radio Frequency Identification) monitoring method for a system comprising at least a first control zone having a first signal range and a second control zone having a second signal range, a data exchange interface connecting the first and second control zones, and a mobile outpost monitor including at least one RFID transceiver, wherein the first control zone comprises a first RFID tracking module, wherein the second control zone comprises a second RFID tracking module, wherein the first RFID tracking module includes at least one RFID reader obtaining tag data transmitted from at least one RFID tag within the first signal range and generating a monitoring information according to the tag data, wherein the second RFID tracking modules includes at least one RFID reader obtaining taq data transmitted from at least one RFID tag within the second signal range and generating a monitoring information according to the tag data, wherein the first control zone comprises a first link interface connecting with the first RFID tracking module to obtain the monitoring information generated by the first RFID tracking module, and wherein the second control zone comprises a second link interface connecting with the second RFID tracking module to obtain the monitoring information generated by the second RFID tracking module, comprising the steps of:

(a) when the mobile outpost monitor moves to into the first signal range of the first control zone, linking with the first RFID tracking module to obtain the monitoring information of the first control zone;

(b) the mobile outpost monitor issuing a monitoring information access request signal through the first link interface, the data exchange interface, and the second link interface of the second control zone to the second RFID tracking module;

(c) the mobile outpost monitor linking with the second RFID tracking module of the second control zone to obtain the monitoring information of the second RFID tracking module through the data exchange interface;

(d) when the mobile outpost monitor moves out the first signal range and into the second signal range the second control zone, linking with the second RFID tracking module to obtain the monitoring information of the second control zone;

(e) the mobile outpost monitor issuing a monitoring information access request signal through the second link interface, the data exchange interface, and the first link interface of the first control zone to the first RFID tracking module; and (f) the mobile outpost monitor linking with the first RFID tracking module of the first control zone to obtain the monitoring information of the first RFID tracking module through the data exchange interface.

10. The mobile RFID monitoring method of claim 9, wherein the first and second RFID tracking modules each include at least one gateway, the gateway connecting the respective RFID reader and link interface.

11. The mobile RFID monitoring method of claim 10, wherein the gateway further connects with a signal transmitter and the monitoring information is transmitted through the signal transmitter to the mobile outpost monitor.

12. The mobile RFID monitoring method of claim 10, wherein the gateway and the mobile outpost monitor are connected through a preset communication protocol.

13. The mobile RFID monitoring method of claim 9, wherein the data exchange interface is an Ethernet.

14. The mobile RFID monitoring method of claim 9, wherein the mobile outpost monitor is a mobile RFID reader.

15. The mobile RFID monitoring method of claim 9, wherein the link interface is a wireless station.

16. The mobile RFID monitoring method of claim 9, wherein the link interface is a wired network interface.

* * * * *